(12) United States Patent
Tanaka et al.

(10) Patent No.: US 7,545,544 B2
(45) Date of Patent: Jun. 9, 2009

(54) IMAGE READING APPARATUS AND IMAGE FORMING APPARATUS

(75) Inventors: Kouta Tanaka, Ebina (JP); Daisuke Imada, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 561 days.

(21) Appl. No.: 11/338,848

(22) Filed: Jan. 25, 2006

(65) Prior Publication Data

US 2007/0070450 A1   Mar. 29, 2007

(30) Foreign Application Priority Data

Sep. 22, 2005   (JP) .............. 2005-276361

(51) Int. Cl.
*H04N 1/04* (2006.01)
*H04N 1/40* (2006.01)

(52) U.S. Cl. .................. 358/496; 358/474; 358/461; 358/471; 358/498

(58) Field of Classification Search ........... 358/496, 358/498, 401, 461, 406, 504, 501, 408, 471; 382/274; 399/374, 364, 367; 355/23, 24
See application file for complete search history.

(56) References Cited

U.S. PATENT DOCUMENTS

2002/0048053 A1*   4/2002   Imai .................... 358/498
2003/0214680 A1*   11/2003  Sugeta et al. .......... 358/461
2004/0027621 A1    2/2004   Masuda et al.
2005/0111059 A1*   5/2005   de Koning ............. 358/498

FOREIGN PATENT DOCUMENTS

| CN | 1477850 | 2/2004 |
|---|---|---|
| JP | A-2000-327159 | 11/2000 |
| JP | A-2001-313794 | 11/2001 |
| JP | A-2002-290685 | 10/2002 |

* cited by examiner

*Primary Examiner*—Cheukfan Lee
(74) *Attorney, Agent, or Firm*—Morgan, Lewis & Bockius LLP

(57) ABSTRACT

The present invention provides an image reading apparatus including: a document feeding unit that feeds a document along a feeding path; a read-out sensor that reads out an image from the document fed by the document feeding unit without stopping the feed; a control unit that causes the read-out sensor to stay on standby in a predetermined retracted position at a distance from the feeding path when it is not necessary to read out the image of the document, and causes the read-out sensor, when it is necessary to read out the image of the document, to move to a predetermined document reading position and to read out the image from the fed document; and an output unit that outputs the image data read out by the read-out sensor.

10 Claims, 6 Drawing Sheets

IMAGE READING APPARATUS AND IMAGE FORMING APPARATUS

This application claims priority under 35 U.S.C. §119 of Japanese Patent Applications No. 2005-276361 filed on Sep. 22, 2005, the entire content of which is hereby incorporated by reference.

BACKGROUND OF THE INVENTION

1. Field of the Invention

The present invention relates to an image reading apparatus for reading out images from a document.

2. Description of the Related Art

Some conventional document feeding devices are provided with a reading device or a read-out sensor such as a CIS (Contact Image Sensor) at a location facing a feeding path, along which documents are fed page by page, and the read-out sensor reads out images in the document without any interruption in the feed. In a document feeding device having such a read-out function, it is necessary to prevent contamination of an optical receiver of the read-out sensor as far as is possible. If contamination of the optical receiver occurs black or white streaks will appear in images that are read out.

In view of the foregoing, for example, one related art discloses a technique for preventing contamination of an optical receiver by providing a cleaning roller upstream of the reading device, which removes contamination from an image intensive area on a surface of the document before it reaches the reading device.

Other related arts disclose a technique for performing shading correction by providing a reference color member beneath a feeding path, and causing the read-out sensor to read the reference color when pages of a document to be read are not on the feeding path. While one of the related arts described above discloses use of a guide roller having a white reference surface as a reference color member, another related art described above discloses use of a roller member having a white outer surface, a rotation member having a polygonal cross-section and white outer surfaces, a rotatable white belt member, or a windable roller-like white member, for use as reference color members.

However, according to the technique disclosed in the related art described above, while it is possible to remove contamination attached to a surface of a document page before it reaches the reading device, it is not possible to prevent contaminants such as paper particles, toner scum, dirt and dust, all of which may be agitated by movement of the document, from becoming attaching to the reading device.

According to the techniques disclosed in other related arts, since the reference color member is provided beneath the feeding path, paper particles, toner scum, dirt and dusts may easily become attached to the reference color member as contaminants over time, thereby interfering with reading out of a proper reference color. The technique also involves a problem in that it requires various complicated processes to be carried out relating to the shading correction process; for example, when the read-out sensor reads the reference color, the white reference surface of the guide roller should be aligned at a position opposing the read-out sensor, or the white belt member should be rotated, or the roller-like white member should be wound so as to replace a tainted reference surface with a clean new reference surface.

SUMMARY OF THE INVENTION

The present invention has been made in view of the above circumstances and provides an image reading apparatus.

According to an embodiment of the present invention, an image reading apparatus includes a document feeding unit that carries a document page along a feeding path; a read-out sensor that reads out images from the document page fed by the document feeding unit without stopping the feed; a control unit that controls the read-out sensor to maintain it on standby in a predetermined retracted position at a set distance from the feeding path when it is not necessary to read out the image of the document page, and controls the read-out sensor, when it is necessary to read out an image on the document page, to move to a predetermined document reading position and to read out images from the fed document; and an output unit that outputs image data read out by the read-out sensor.

BRIEF DESCRIPTION OF THE DRAWINGS

Embodiments of the present invention will be described in detail with reference to the following figures, wherein.

DETAILED DESCRIPTION OF THE INVENTION

A. First Embodiment

Figure 1:
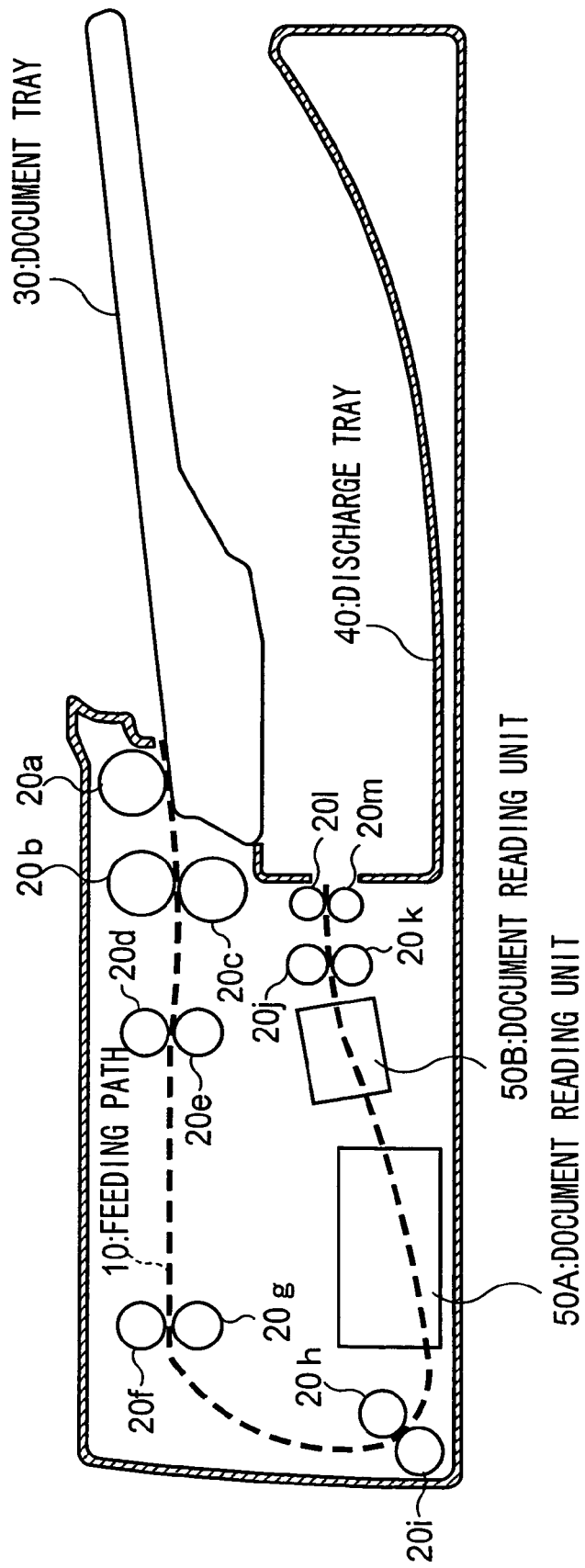
FIG. 1 is a cross-sectional view of an automatic document feeder 1 of the first embodiment according to the present invention.

FIG. 1 is a cross-sectional view of an automatic document feeder 1 according to an embodiment of the present invention. The automatic document feeder 1 uses a CVT (constant velocity transport) system, by which documents are scanned while they are being fed, instead of a belt drive system in which documents are scanned while feeding is stopped. The automatic document feeder 1 comprises plural feeding rollers 20a, 20b, ... 20l, and 20m driven by a driving motor, not shown in the figure, to feed documents placed in a document tray 30 page by page along a feeding path 10 indicated by a broken line in FIG. 1 and to discharge them to a discharge tray 40.

The automatic document feeder 1 also comprises document reading units 50A, 50B. In the embodiment shown in FIG. 1, the front surfaces of the documents fed along the feeding path 10 are scanned by the document reading unit 50A, and the back surfaces are scanned by the document reading unit 50B. The image data read out by the document reading units 50A, 50B are transferred to an image forming apparatus connected to the automatic document feeder 1 such as a copier or printer, not shown here, and is used as image data to be printed. Namely, the automatic document feeder 1 can transfer the image data read by the document reading units 50A, 50B to the outer devices, or the image forming apparatus can output the images based on the image data transferred from the automatic document feeder 1 by printing it on recording paper.

Figure 2A:
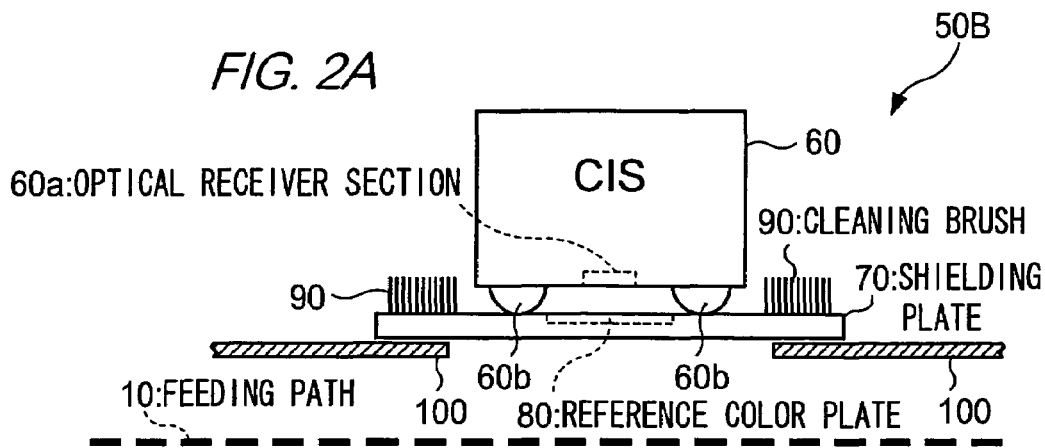
FIGS. 2A to 2C are respectively front views illustrating an inner configuration of the document reading unit 50B for reading the back surface according to the first embodiment.
Figure 2B:
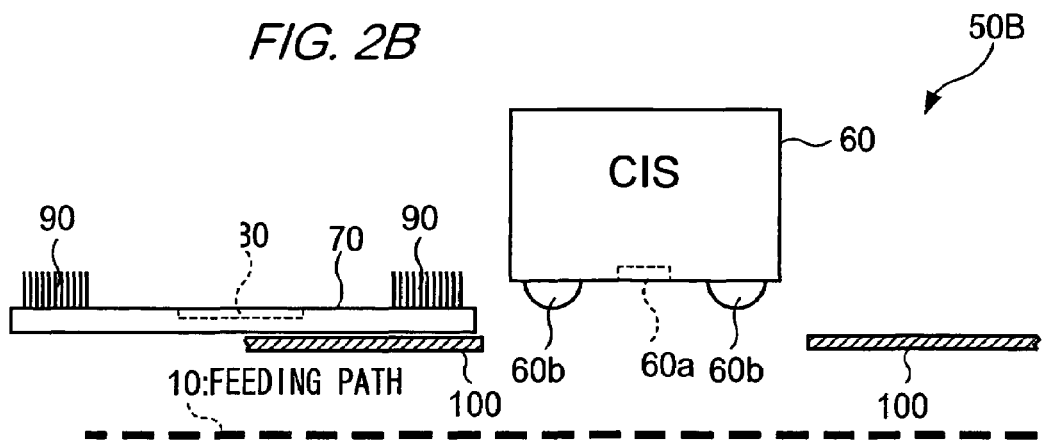

FIGS. 2A and 2B illustrate a configuration inside the document reading unit 50B for reading a back surface of the document fed along the feeding path 10. The CIS 60 is a contact image sensor for optically reading an image of the document by emitting a light from a light source such as a light-emitting diode, and receiving the light which is reflected. The CIS comprises an optical receiver section 60a for receiving reflected light in a lower middle area thereof as shown in FIG. 2A. Semi-spherical projections 60b are provided at both surfaces of the optical receiver section 60a for preventing the fed document from directly attaching to the optical receiver section 60a when the CIS 60 moves to a predetermined reading position along the feeding path 10 or a document delivery surface for scanning the document.

A shielding plate 70 is provided beneath the CIS 60 as shown in FIG. 2A. The shielding plate 70 is an openable/closable plate; that is, it is closed, as shown in FIG. 2A, to shield the CIS 60 from the feeding path 10 while the CIS 60 is on standby in a predetermined retracted position away from the feeding path 10, when the document reading unit 50B is not scanning the back surface. As shown in FIG. 2B, the shielding plate 70 is opened by being moved to the left as viewed in the drawing. A reference color plate 80 which is colored with a reference color, such as white, for use in a shading correction process, is attached to an upper middle area of the shielding plate 70. The reference color plate 80 is in an opposed position to the optical receiver section 60a of the CIS 60 while the shielding plate 70 is closed. The shielding plate 70 also comprises a cleaning brush 90 for cleaning the optical receiver section 60a of the CIS 60.

The automatic document feeder 1 is provided with a control portion, not shown in the drawings, that controls the location of the CIS 60, by moving the CIS 60 to a predetermined reading position facing the feeding path 10 when the back surface of a document is being scanned by the document reading unit 50B, and by moving the CIS 60 to a predetermined retracted position after the scanning is finished. The control portion also functions to perform shading correction by causing the CIS 60 to read the reference color on the reference color plate 80, and to control opening and closing of the shielding plate 70.

Next, operation of the automatic document feeder 1 will be described by referring to FIGS. 2A to 2C. First, when it is not required to read the back surface of a document, the CIS 60 of the document reading unit 50B remains on standby in the predetermined retracted position at a distance from the feeding path 10, and the shielding plate 70 remains in a closed position. That is, when it is not necessary to scan the back surface of the document, the shielding plate 70 shields the CIS 60 and the feeding path 10 from each other. Cases in which reading the back surface of a document is not required, include situations where mains power is turned off, where no documents are fed even when the mains power in turned on, where a scanning command is input only for scanning the front surfaces of documents, etc.

In the situation shown in FIG. 2A, the control portion causes the CIS 60 to read the reference color on the reference color plate 80 and performs a shading correction. The shading correction compensates for noises resulting from variations in the amount of light emitted from the light source to the documents or variations in the sensitivities of the optical receiver elements arranged in the CIS 60. Timing for performing the shading correction process can be set at any moment within a period when the CIS 60 is on standby in the retracted position and the shielding plate 70 is closed.

When the documents are placed in the document tray 30 and a command for scanning both surfaces is input, the control portion first opens the shielding plate 70 as shown in FIG. 2B. While the shielding plate 70 is being opened, the cleaning brush 90 attached to the shielding plate 70 makes sliding contact with the optical receiver section 60a of the CIS 60 to thereby remove the contaminants attached to the optical receiver section 60a. Then the control portion moves the CIS 60 to a predetermined reading position facing the feeding path 10 or document delivery surface, as shown in FIG. 2C. The documents placed in the document tray 30 are fed page by page along the feeding path 10, and the CIS 60 scans images on the back surfaces of the fed documents one by one without bringing them to a halt. The control portion also transfers the image data read out by the CIS 60 to the image forming apparatus. connected to the automatic document feeder 1.

When the scanning of the back surfaces of all of the documents placed in the document tray 30 is finished, the control portion moves the CIS 60 to the retracted position away from the feeding path 10, as shown in FIG. 2B. Then the control portion closes the shielding plate 70 as shown in FIG. 2A. When the shielding plate 70 is closed, the cleaning brush 90 attached to the shielding plate 70 makes sliding contact with the optical receiver section 60a to remove the contamination attached to the optical receiver section 60a.

Figure 2C:
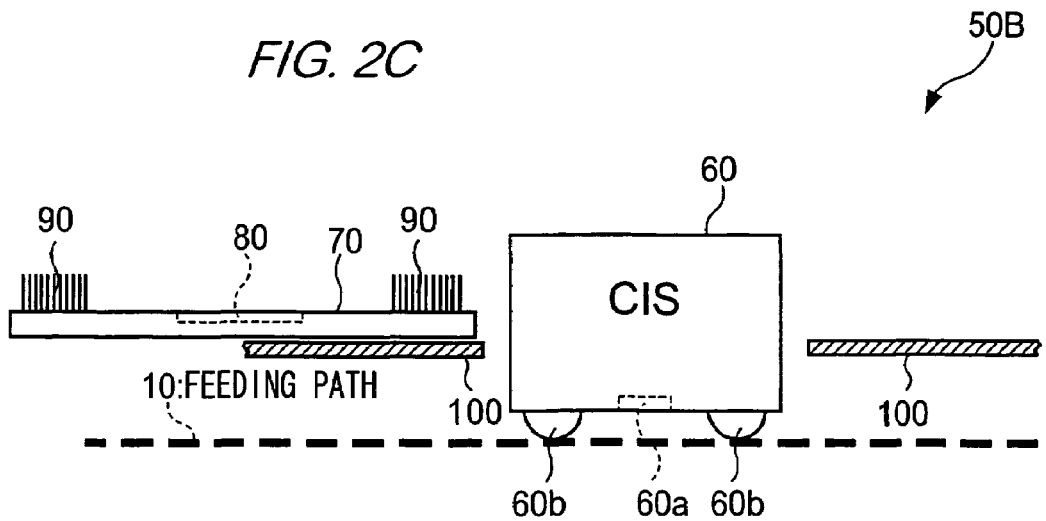
Figure 3:
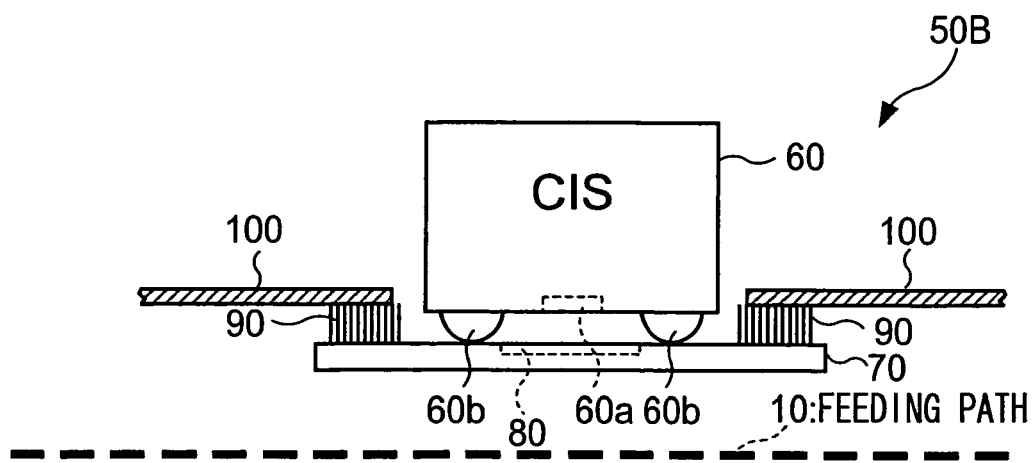
FIG. 3 is a front view of a first modification of the document reading unit 50B.

Meanwhile, the shielding plate 70 can be arranged below the partition plate 100 instead being arranged above a partition plate 100 that generally covers the feeding path 10 as shown in FIGS. 2A to 2C. Also, the reference color plate 80 can be replaced by a shielding plate 70 having a surface coated with the reference color used for the shading correction, or it can be made of a material having a ground color identical to the reference color.

As is described above, according to the automatic document feeder 1 of the present embodiment, when it is not necessary to scan the back surfaces, the CIS 60 is caused to stay on standby in the retracted position away from the feeding path 10 within the document reading unit 50B, and the shielding plate 70 is closed, so that the CIS 60 is shielded from the feeding path 10. Therefore, paper particles, toner scum, dirt and dust that that may be agitated by the movement of the document are prevented from being attached to the reading device as contaminants.

Since the reference color plate 80 is provided above the feeding path 10, contaminants such as paper particles, toner scum, dirt and dust attached to the reference color plate 80 are also reduced as compared to the conventional arrangement. The present embodiment is also advantageous because it is not necessary to align the white reference surface of the guide roller to a position opposing the read-out sensor when the read-out sensor reads the reference color, or to rotate the white belt member or to wind the roller-like white member so as to replace a tainted reference surface with a new, clean reference surface, as has been necessary as described in the aforementioned Patent Documents No. 2 and No. 3. Thus, the shading correction process is simplified and the apparatus is made smaller. It is also advantageous because the cleaning brush 90 is attached to the shielding plate 70, to thereby clean the optical receiver section 60a of the CIS 60 by the opening and closing movements of the shielding plate 70, thus eliminating independent operations for cleaning the optical receiver section 60a and opening/closing the shielding plate 70.

Figure 4:
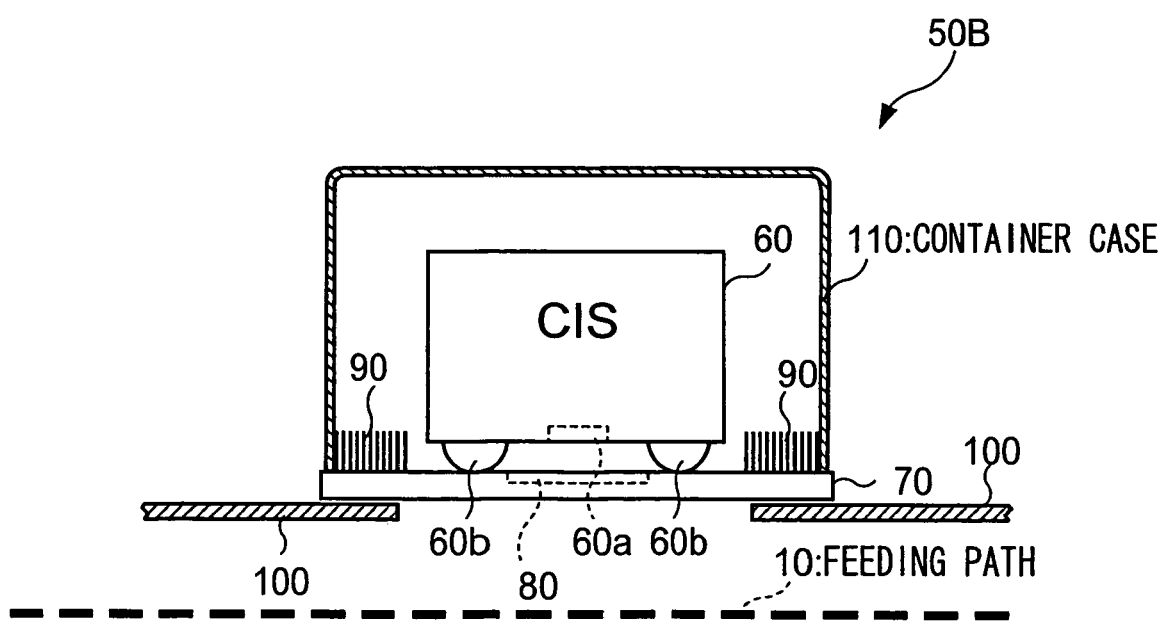
FIG. 4 is a front view of a second modification of the document reading unit 50B.

A modification of the configuration inside the document reading unit 50B can be made as shown in FIG. 4. Here, a container case 110 is provided at the retracted position for housing the CIS 60 therein. By moving the shielding plate 70 to a closed position after the CIS 60 is retracted, the inner space of the container case 110 is sealed off and the CIS 60 on standby is isolated within the inner space of the automatic document feeder 1. With such a configuration, the attachment of the paper particles, toner scum, dirt and dust to the CIS 60 on standby is securely prevented. It is also possible to provide a protection case for partially covering the CIS 60, such as for shielding only the optical receiver section 60a of the CIS 60 for example, instead of the container case 110 for entirely covering the CIS 60.

Figure 5A:
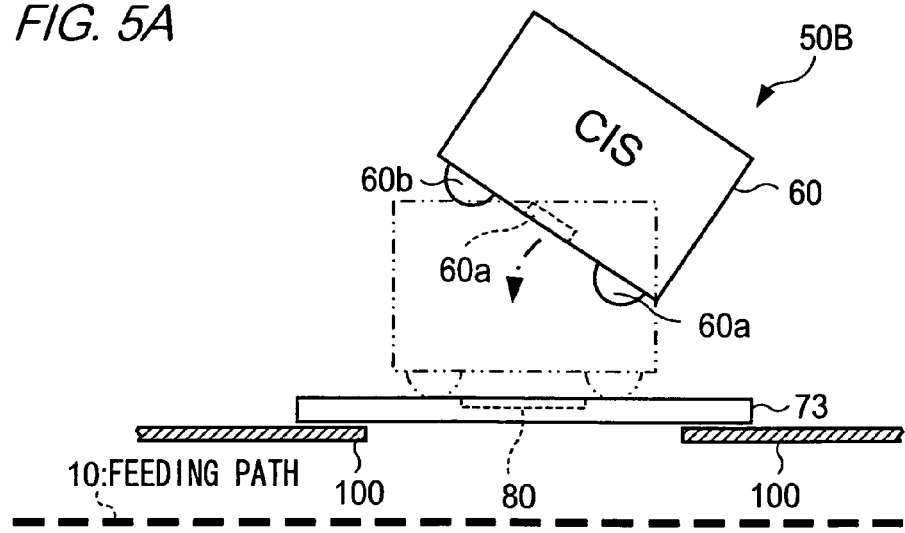
FIG. 5 is a front view of a third modification of the document reading unit 50B.
Figure 5B:
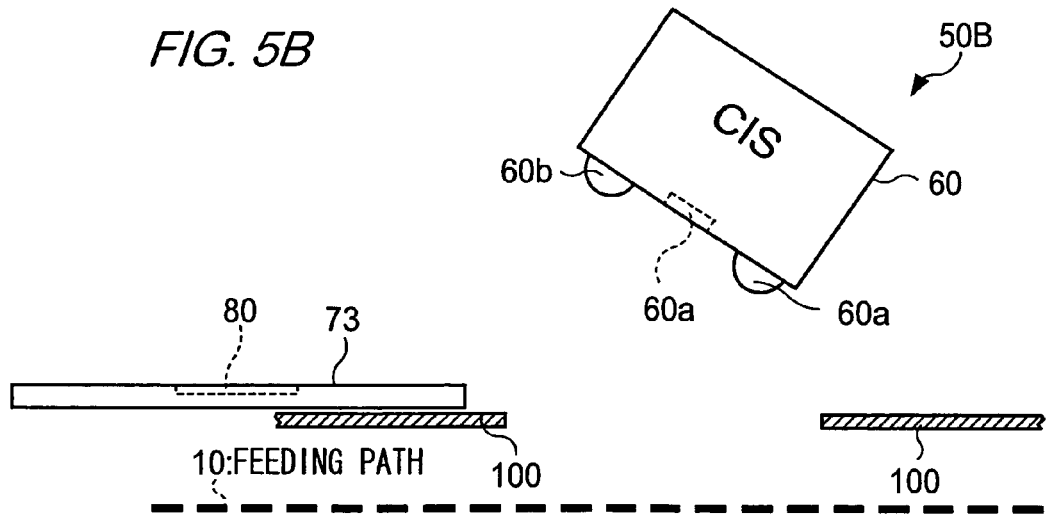
Figure 5C:
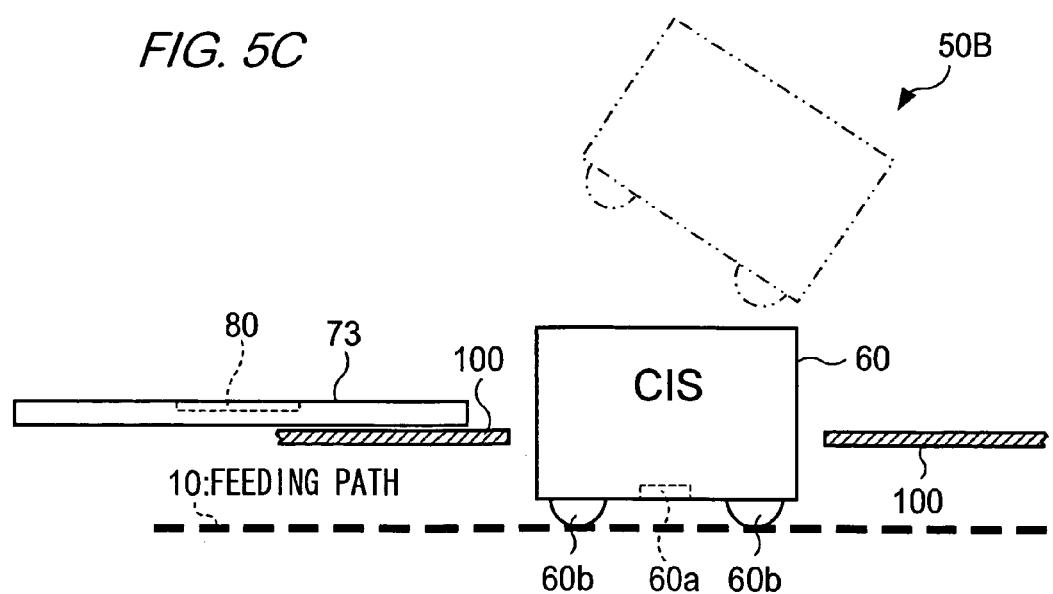

Other modifications of the configuration inside the document reading unit 50B can be made as shown in FIGS. 5A to 5C. Here, the retracted position, shown by a solid line in FIG. 5A, is arranged at a further location from the feeding path 10, and when performing the shading correction, the CIS 60 is moved to a closer position, shown by a broken line, to read out the reference color on the shielding plate 73. Timing for the shading correction process can be set at any moment within a period when the CIS 60 is on standby in the retracted position and the shielding plate 73 is closed, in the same manner as in the first embodiment described above. When a command for scanning both surfaces (or a back surface) is input, the control portion, after opening the shielding plate 73 as shown in FIG. 5B, causes the CIS 60 to move to the reading position facing the feeding path 10 and to scan the back surface of the fed document.

B. Second Embodiment

A second embodiment will now be described. Differences between the automatic document feeder 1 according to this embodiment and the automatic document feeder 1 described in the first embodiment stay only in the inner configurations of the document reading unit 50B for reading out the back surface. Thus, explanations of common configurations with the first embodiment are omitted, and the same notes or numerals depict such configurations.

Figure 6A:
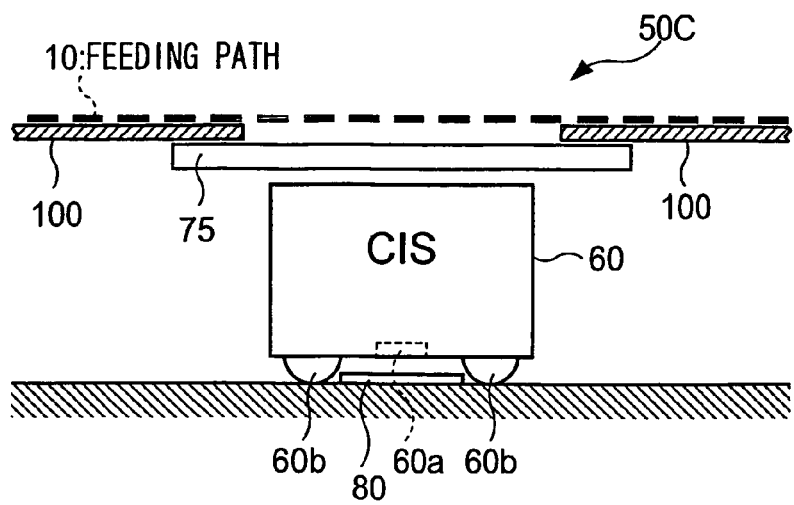
FIGS. 6A to 6C are respectively front views illustrating an inner configuration of the document reading unit 50C for reading the back surface according to the first embodiment.

FIG. 6 shows a configuration inside the document reading unit 50B for reading a back surface. When it is not required to read out the back surface of a document, the CIS 60 of the document reading unit 50B stays on standby in the predetermined retracted position beneath the feeding path 10, and the shielding plate 75 is closed. That is, when it is not necessary to scan the back surface of the document, the shielding plate 75 shields the CIS 60 and the feeding path 10 from each other. The operation when reading of the back surface is not required is the same as that described in the first embodiment. The shielding plate 75 of this embodiment is not provided with the reference color plate 80 or cleaning brush 90 which are provided in the first embodiment, and the reference color plate 80 is provided on the inner wall of the document reading unit 50B opposite to the optical receiver section 60a of the CIS 60 staying on standby, as shown in FIG. 6A.

In the situation shown in FIG. 6A, the control portion causes the CIS 60 to read the reference color on the reference color plate 80 and performs a shading correction. Timing for the shading correction process can be set in the same way as in the first embodiment. Also, the reference color plate 80 can be replaced by a wall of the document reading unit 50B coated with a reference color used for the shading correction, or by a wall made of a material having a ground color used as a reference color.

Figure 6B:
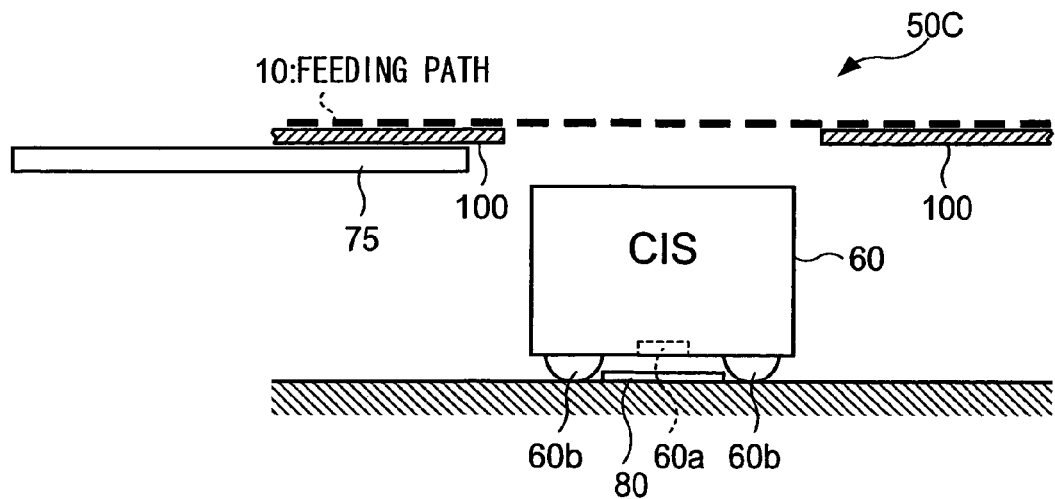
Figure 6C:
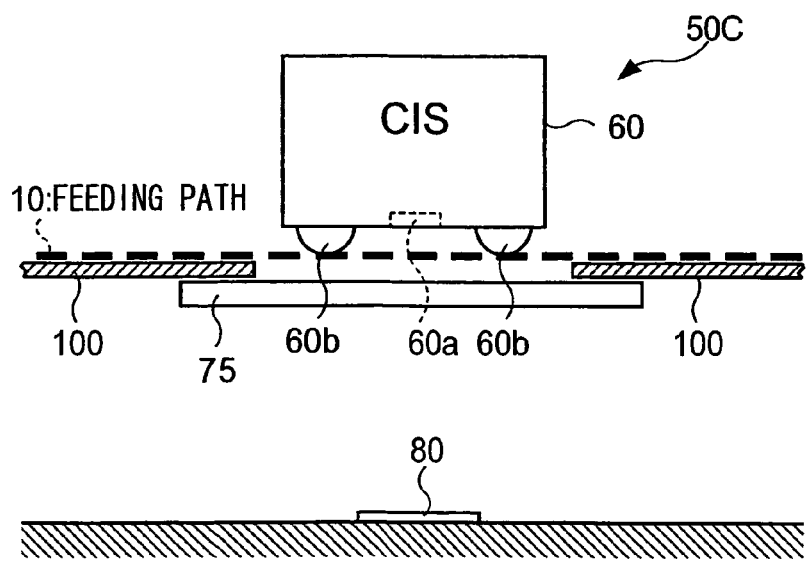

When the documents are placed in the document tray 30 and a command for scanning both surfaces (or the back surface) is input, the control portion opens the shielding plate 75 as shown in FIG. 6B. Then the control portion moves the CIS 60 to the reading position facing the feeding path 10, as shown in FIG. 6C, and closes the shielding plate 75. The control portion causes the CIS 60 to scan images on the back surfaces of the fed documents and transfers the read out image data to the image forming apparatus. After finishing scanning the back surface of all of the documents placed in the document tray 30, the control portion opens the shielding plate 75 as shown in FIG. 6B, and after moving the CIS 60 to the retracted position beneath the feeding path, closes the shielding plate 75.

As is described above, according to the automatic document feeder 1 of the present embodiment, when it is not necessary to scan the back surfaces, the CIS 60 is caused to stay on standby in the retracted position away from the feeding path 10 within the document reading unit 50B and the shielding plate 75 is closed, so that the CIS 60 is shielded from the feeding path 10. Therefore, paper particles, toner scum, dirt and dust that can be agitated by the movement of the document are prevented from being attached to the reading apparatus as contaminants. Although the reference color plate 80 is provided beneath the feeding path 10, since the shielding plate 75 is closed except during the period when the CIS 60 is being moved, attachment of the contaminants is reduced compared to the conventional configurations. The configuration allows the shading correction process to be simplified, and the apparatus to be made smaller.

C. Third Embodiment

A third embodiment will now be described. Differences between the automatic document feeder 1 according to this embodiment and the automatic document feeder 1 described in the first embodiment stay only in the inner configurations of the document reading unit 50B for the back surface. Thus, explanations for common configurations with the first embodiment are omitted, and the same notes or numerals depict such configurations.

Figure 7A:
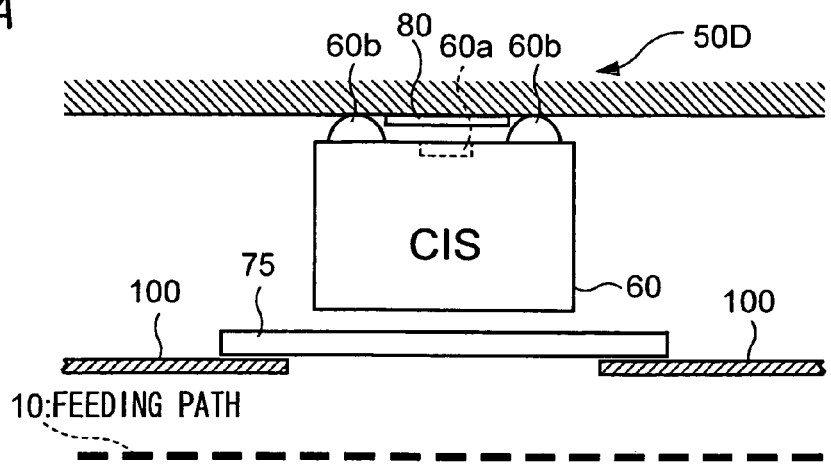
FIGS. 7A to 7C are respectively front views illustrating an inner configuration of the document reading unit 50D for reading the back surface according to the first embodiment.

First, where reading of the back surface of a document is not required, the CIS 60 of the document reading unit 50B stays on standby in a predetermined retracted position over the feeding path 10, by being reversed by 180 degrees to an upside-down position, as shown in FIG. 7A, and the shielding plate 75 is closed. The operation for the case where reading of the back surface is not required is the same as that described in the first embodiment. The shielding plate 75 here is not attached with the reference color plate 80 or the cleaning brush 90 as described in the first embodiment, and the reference color plate 80 is provided at a position on the inner wall of the document reading unit 50B, opposite the optical receiver section 60a of the CIS 60 on standby, as shown in FIG. 7A.

In the situation shown in FIG. 6A, the control portion causes the CIS 60 to read the reference color on the reference color plate 80, and performs a shading correction. Timing for the shading correction process can be set in the same way as for the first embodiment. Also, the reference color plate 80 can be replaced with the inner wall of the document reading unit 50B coated with the reference color for the shading correction or with the inner wall made from a material having a ground color identical to the reference color.

Figure 7B:
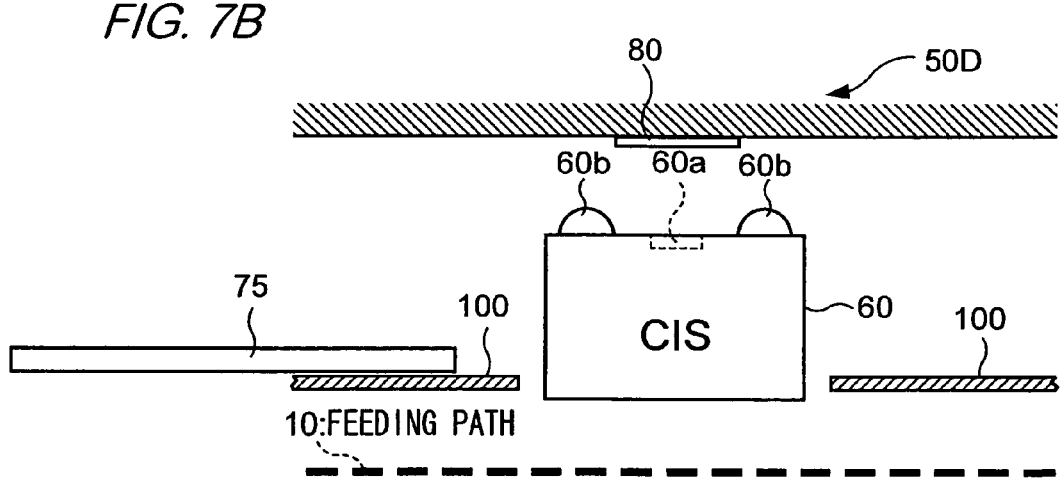
Figure 7B:
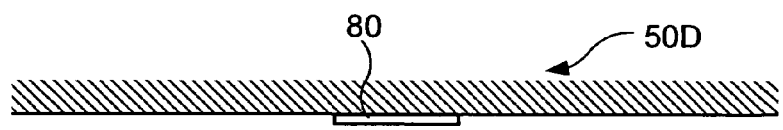
Figure 7C:
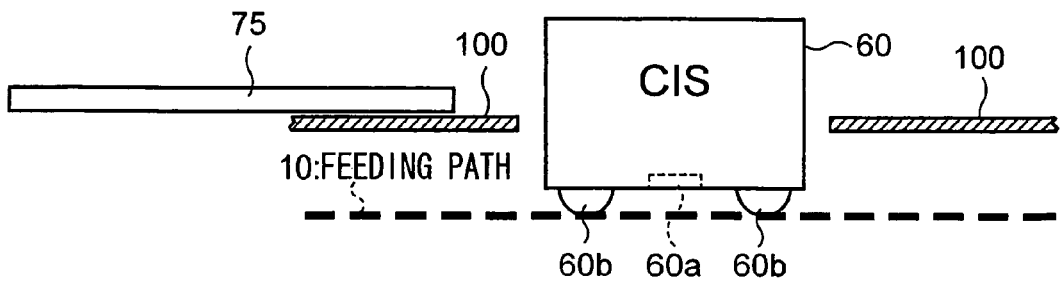

When the documents are placed in the document tray 30, and a command for scanning both surfaces (or the back surface) is input, the control portion opens the shielding plate 75 and reverses the CIS 60 by 180 degrees, as shown in FIG. 7B. Then the control portion moves the CIS 60 to the reading position facing the feeding path 10, as shown in FIG. 7C. The control portion causes the CIS 60 to scan images on the back surfaces of the fed documents, and transfers the read out image data to the image forming apparatus. After finishing scanning both surfaces, or the back surfaces, of all of the documents placed in the document tray 30, the control portion opens the shielding plate 75 as shown in FIG. 7B, and after moving the CIS 60 to the retracted position over the feeding path 10, closes the shielding plate 75.

As is described above, according to the automatic document feeder 1 of the third embodiment, the same advantages can be obtained as in the first embodiment, except for the cleaning of the optical receiver section 60*a* of the CIS 60. Although, in the embodiments described above, the present invention is applied to the document reading unit 50B for reading the back surface, it can be applied to the document reading unit 50A for reading the front surface of the documents. The present invention is not applied only to the automatic document feeder 1 of the type that can scan both surfaces, but is also applicable to those capable of scanning a single surface. The automatic document feeder 1 can be an image forming apparatus integrated with a copier or printer.

As is described above, the present invention provides an image reading apparatus including: a document feeder that feeds a document along a feeding path; a read-out sensor that reads out images from the document fed by the document feeding unit without stopping the feed; a control unit that causes the read-out sensor to stay on standby in a predetermined retracted position at a distance from the feeding path when it is not necessary to read out the image of the document, and controls the read-out sensor, when it is necessary to read out the image of the document, to move to a predetermined document reading position and to read out images from the fed document; and an output unit that outputs the image data read out by the read-out sensor.

According to an embodiment of the present invention, the read-out sensor stays on standby in the predetermined retracted position at a distance from the feeding path when it is not necessary to read out the image of the document. Therefore, attachment of contaminants such as paper particles, toner scum, dirt and dust, which can be agitated by the movement of the document, to the optical receiver portion of the read-out sensor, may be reduced.

The apparatus may further include a shield unit that shields the read-out sensor staying on standby at the retracted position from the feeding path.

The apparatus may further include: a plane colored with a reference color for use in a shading correction of the read-out sensor provided at a position opposite an optical receiver section of the read-out sensor staying on standby at the retracted position; and a correction unit that performs the shading correction by causing the read-out sensor to read the reference color while the read-out sensor stays on standby at the retracted position.

The apparatus may further include: an openable and closable shielding plate that shields the read-out sensor staying on standby at the retracted position from the feeding path; and a shielding plate drive unit that closes the shielding plate during the read-out sensor stays on standby at the retracted position for shielding the read-out sensor from the feeding path.

The shielding plate may have a plane colored with a reference color for use in a shading correction of the read-out sensor at a position opposite an optical receiver section of the read-out sensor staying on standby at the retracted position, and the apparatus may further include a correction unit that performs the shading correction by causing the read-out sensor to read the reference color while the read-out sensor stays on standby at the retracted position.

The shielding plate may have a cleaning member on a surface opposite an optical receiver section of the read-out sensor staying on standby at the retracted position for removing contaminants attached to the optical receiver section, so that the cleaning member is adapted to remove contaminants attached to the optical receiver section while making sliding contact with the optical receiver section when the shielding plate is open or closed.

An image forming apparatus according to an embodiment of the present invention may include the aforementioned document reading apparatus.

According to an embodiment of the present invention, attachment of contaminants to the optical receiver portion of the read-out sensor or to the surface coated with the reference color used for the shading correction may be reduced, to thereby prevent deterioration in quality of the image read out from a document.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described to best explain the principles of the invention and its practical applications, to thereby enable others skilled in the art to understand various embodiments of the invention and various modifications thereof, to suit a particular contemplated use. It is intended that the scope of the invention be defined by the following claims and their equivalents.

What is claimed is:

1. An image reading apparatus, comprising:
   a document feeding unit that feeds a document along a feeding path;
   a read-out sensor that reads out an image from the document fed by the document feeding unit without stopping the feed;
   a control unit that causes the read-out sensor to stay on standby in a predetermined retracted position at a distance from the feeding path when it is not necessary to read out the image from the document, and controls the read-out sensor, when it is necessary to read out the image from the document, to move to a predetermined document reading position, in such a way that an optical receiver of the read-out sensor in both the predetermined retracted position and the predetermined reading position is always within a space having side edge perpendicular to a section of the feeding path the predetermined document reading position, and to read out the image from the fed document; and
   an output unit that the image data read out by the read-out sensor.

2. The apparatus according to claim 1, further comprising a shield unit that shields the read-out sensor staying on standby at the retracted position from the feeding path.

3. The apparatus according to claim 2, further comprising:
   a plane colored with a reference color for use in a shading correction of the read-out sensor provided at a position opposite the optical receiver of the read-out sensor staying on standby at the retracted position; and
   a correction unit that performs the shading correction by causing the read-out sensor to read the reference color while the read-out sensor stays on standby at the retracted position.

4. The apparatus according to claim 1, further comprising:
   a plane colored with a reference color for use in a shading correction of the read-out sensor provided at a position opposite the optical receiver of the read-out sensor staying on standby at the retracted position; and a correction unit that performs the shading correction by causing the read-out sensor to read the reference color while the read-out sensor stays on standby at the retracted position.

5. The apparatus according to claim 1, further comprising:

an openable and closable shielding plate that shields the read-out sensor staying on standby at the retracted position from the feeding path; and a shielding plate drive unit that closes the shielding plate while the read-out sensor stays on standby at the retracted position for shielding the read-out sensor from the feeding path.

6. The apparatus according to claim 5, wherein the shielding plate includes a plane colored with a reference color for use in a shading correction of the read-out sensor at a position opposite to the optical receiver of the read-out sensor staying on standby at the retracted position, further comprising a correction unit that performs the shading correction by causing the read-out sensor to read the reference color while the read-out sensor stays on standby at the retracted position.

7. The apparatus according to claim 6, wherein the shielding plate has a cleaning member on a surface opposite the optical receiver of the read-out sensor staying on standby at the retracted position for removing contaminants attached to the optical receiver, the cleaning member being adapted to remove contaminants attached to the optical receiver while causing sliding contact with the optical receiver when the shielding plate is open or closed.

8. The apparatus according to claim 5, wherein the shielding plate has a cleaning member on a surface opposite an optical receiver of the read-out sensor staying on standby at the retracted position for removing contaminants attached to the optical receiver, the cleaning member being adapted to remove contaminants attached to the optical receiver while causing sliding contact with the optical receiver when the shielding plate is open or closed.

9. An image forming apparatus comprising claim 1, further comprising a partition plate provided between the predetermined retracted position and the feeding path, that has an opening through which the read-out sensor can pass, wherein the side edges of the space are in contact with an edge of the partition plate surrounding the opening.

10. An image forming apparatus comprising an image reading apparatus, the image reading apparatus, comprising:

a document feeding unit that feeds a document along a feeding path;

a read-out sensor that reads out an image from the document fed by the document feeding unit without stopping the feed;

a control unit that causes the read-out sensor to stay on standby in a predetermined retracted position at a distance from the feeding path when it is not necessary to read out the image of the document, and controls the read-out sensor, when it is necessary to read out the image of the document, to move to a predetermined document reading position, in such a way that an optical receiver of the read-out sensor in both the predetermined retracted position and the predetermined reading position is always within a space having side edges perpendicular to a section of the feeding path facing the predetermined document reading position, and to read out the image from the fed document; and an output unit that outputs the image data read out by the read-out sensor.

* * * * *